United States Patent

[11] 3,633,174

[72] Inventor Jon H. Griffin
Rockville, Md.
[21] Appl. No. 28,332
[22] Filed Apr. 14, 1970
[45] Patented Jan. 4, 1972
[73] Assignee The United States of America as represented by the Secretary of the Navy

[54] MEMORY SYSTEM HAVING SELF-ADJUSTING STROBE TIMING
4 Claims, 5 Drawing Figs.

[52] U.S. Cl. .......... 340/172.5, 235/153
[51] Int. Cl. .......... G06f 11/00
[50] Field of Search .......... 340/172.5, 174 ED, 174 WA, 174 JC, 174 TC; 235/153; 324/73 AT

[56] References Cited

UNITED STATES PATENTS

| | | | |
|---|---|---|---|
| 3,363,235 | 1/1968 | Rhodes | 340/172.5 |
| 3,394,355 | 7/1968 | Sliwkowski | 340/172.5 |
| 3,440,609 | 4/1969 | Bray | 340/172.5 |
| 3,478,286 | 11/1969 | Dervan | 235/153 |
| 3,501,754 | 3/1970 | Davie | 340/174 |
| 3,537,075 | 10/1970 | Anderson et al. | 340/172.5 |
| 3,208,050 | 9/1965 | Bird et al. | 340/172.5 |

OTHER REFERENCES

Womack, C. P.; Schmoo Plot Analysis of Coincident-Current Memory Systems In IEEE Transactions on Electronic Computers; Feb. 1965; pp. 36–44

*Primary Examiner*—Paul J. Henon
*Assistant Examiner*—Melvin B. Chapnick
*Attorneys*—R. S. Sciascia and Thomas O. Watson, Jr.

ABSTRACT: An adaptive memory system comprising a core memory, utilizing externally generated read strobe pulses; an exerciser which writes a test pattern into the memory, and compares the result with a predetermined desired performance of the memory; a strobe generator which controls the exerciser and the memory system, performs a failure analysis on the results of the testing by the exerciser and determines the optimum timing of the read strobe pulses supplied to the memory; and interface gating, used to tie the memory to equipment outside the memory system during its normal mode of operation, or to the exerciser during its adaptive mode of operation.

INVENTOR.
JON H. GRIFFIN
BY Thomas O. Watson Jr.
ATTORNEY

CODE
INPUT/OUTPUT
1 REPRESENTS FAILURE
0 REPRESENTS NO FAILURE

MEMORY SYSTEM HAVING SELF-ADJUSTING STROBE TIMING

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to memory systems used in modular computer hardware and more particularly pertains to self adaptability of various memory parameters to accommodate replacement of the memory without the requirement of manual readjustment of said parameters.

Those concerned with the development of modular computer hardware long recognized that the most restrictive requirement encountered when implementing a high-speed memory system with modular hardware is to be able to completely interchange the memory core over the life of the system without the need of manual system adjustments. Due to normal and uncontrollable spreads in manufacturing tolerances, it is impracticable, if not impossible, to guarantee a parameter, such as read strobe pulse timing, that will not require manual adjustment when memories having cycle times less than 2 microseconds are interchanged.

SUMMARY OF THE INVENTION

The instant invention contemplates as a solution to the many problems encountered when requiring the interchangeability of memory cores without manual readjustment of the memory parameters, a system which performs a set of self measurements and adjusts a memory parameter for optimum results.

This is accomplished by the use of four principle components which are: the core memory itself, an exerciser, a strobe generator, and interface gating. The core memory may be any memory which has the desired performance characteristics. Although any core memory system may be employed, it must be modified so that the read strobe pulse timing or other parameter to be made self adjusting is generated externally rather than by the memory's internal timing chain. The memory need not necessarily be a core memory, but may be any other type of memory, such as a plated wire or planar film type.

The exerciser performs the function of testing the core memory. The exerciser writes a suitable test pattern, for example, a worst pattern or worst pattern bit complement, into all the addresses in the core memory system. It then reads the data output of each address in the memory and compares it with the date written into each address. If an error is noted at any address, a failure signal along with a clock pulse is transmitted to the strobe generator. If no errors occur, a no-failure signal along with a clock pulse is transmitted to the strobe generator. This test cycle is repeated until inhibited by the strobe generator.

The strobe generator basically has three functions. The first is to control the exerciser and the core memory system. The second is to perform a failure analysis on the results of the testing accomplished by the exerciser and determine therefrom the optimum timing to be used for the strobe pulses sent to the core memory. The third is to present strobe pulses with optimum timing to the core memory system during the normal mode of memory system operation.

Interface gating is used to tie the core memory to equipment outside the memory system itself, during normal operation or, to the exerciser, during the adaptive mode of operation.

Read pulse timing is the most critical parameter in most core memory systems. However, the approach of this invention could be expanded so that other memory parameters such as *xy* drive currents could also be made self adaptive. In addition to compensating for manufacturing tolerances, the techniques of this invention could be used to compensate for variations in the magnetic core parameters caused by variations in operating temperatures. The general purpose of this invention therefore, is to provide a self adaptive memory system for modular structured computers that has all the advantages of similarly employed prior art devices and has none of the described disadvantages. To obtain this, the present invention provides a strobe generator functioning in conjunction with an exerciser to test and evaluate a core memory's operation and to readjust the timing of read strobe pulses or other memory parameters, when required, in response to such testing and evaluation.

OBJECTS OF THE INVENTION

An object of the present invention is the provision of an adaptive memory system that requires no manual adjustment of memory parameters upon placement of said memory system in operation.

Another object is to provide a self adaptive memory system which is capable, upon initiation, of testing the memory and determining from such tests whether and to what degree the timing of the memory read pulse or other memory parameter should be adjusted, and so adjust it.

Other objects, advantages and novel features of the invention will become apparent from the following detailed description of the invention when considered in conjunction with the accompanying drawings.

DESCRIPTION OF THE PREFERRED EMBODIMENTS

Figure 1:
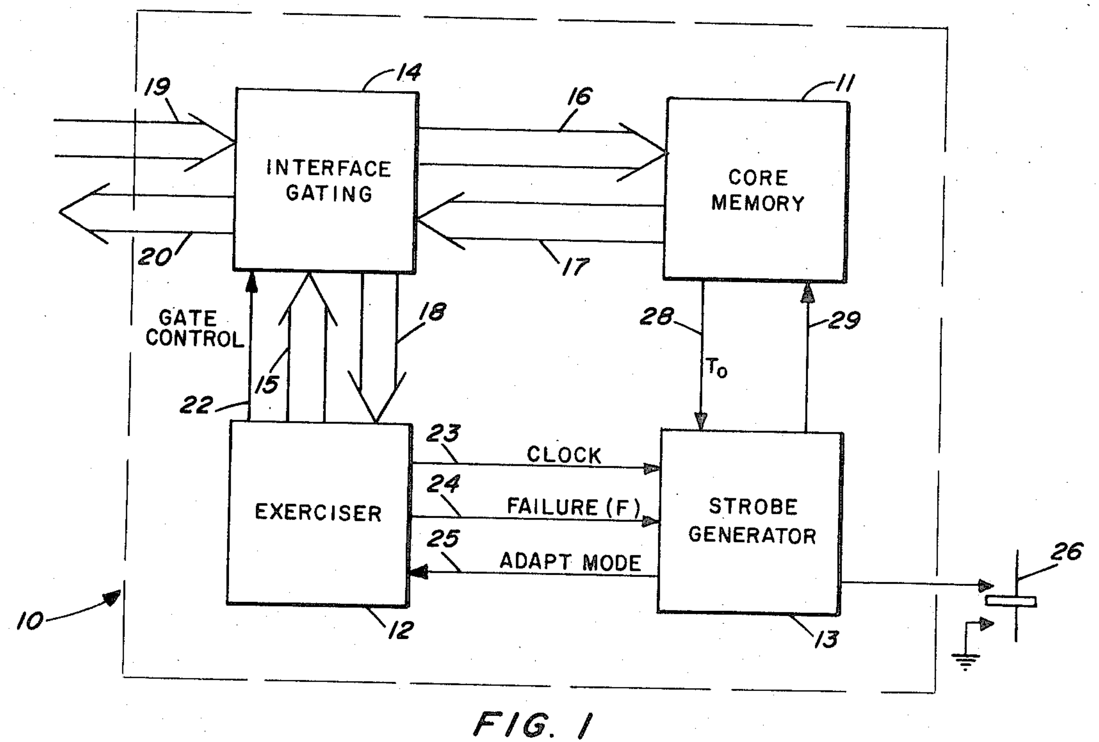
FIG. 1 illustrates the four basic components of the invention and their functional relationship.

FIG. 1, which illustrates the preferred overall arrangement and functional relationship of the basic components of the invention, shows the basic operation of each of the four elements. Adaptive memory system 10 comprises strobe generator 13, exerciser 12, core memory 11, and interface gating 14.

These four basic components interact with each other in the following manner. When the adapt mode is initiated by depressing adapt mode button 26, strobe generator 13 commands exerciser 12, over adapt mode line 25, to cause interface gating 14 to switch input and output lines 16 and 17 of core memory 11, from connection with data lines 19 and 20, to connection with data lines 19 and 20, which lead to the exerciser and consequently puts core memory 11 under control of exerciser 12. The exerciser, upon causing interface gating 14 to accomplish this switching function, runs a test on core memory 11 using the timing of a trail strobe pulse supplied by strobe generator 13. Results of the test are noted by the strobe generator. Exerciser 12 repeats the test with a new trail strobe pulse supplied by the strobe generator and again the results are noted by strobe generator 13. This process is iterated until the results of a series of trails have been noted by strobe generator 13. The strobe generator then selects the read strobe pulse having optimum timing.

Generally, some of the trail strobes will cause failure because they occur too early. Others will cause failure because they occur too late. The strobe pulses in the middle, between the two extremes, will allow proper memory operation. Of those several medium strobe pulses strobe generator 13 selects the central strobe pulse.

Strobe generator 13 then causes the system to switch to its normal mode of operation, which simply means that interface gating 14 reconnects input 16 and output 17 of core memory 11 to external data lines 19 and 20 and strobe generator 13 is now used to supply the read strobe pulses to the read sense wires of memory 11. This continues until the adaptive mode of the system is reinitiated by actuation of button 26.

Exerciser 12, interface gating 14, and core memory 11 is an apparatus of the type that is well known in the art to perform the functions described. Exemplary of the exerciser and core memory is the apparatus described in an article by Womack, "Schmoo Plot Analysis of Coincident - Current Memory Systems," IEEE Transactions on Electronic Computers, Feb. 1965, pages 36–44. Because of the notoriety of such apparatus a more specific disclosure is not seen as necessary and further discussion will, therefore, be limited to strobe generator 13.

Figure 2:
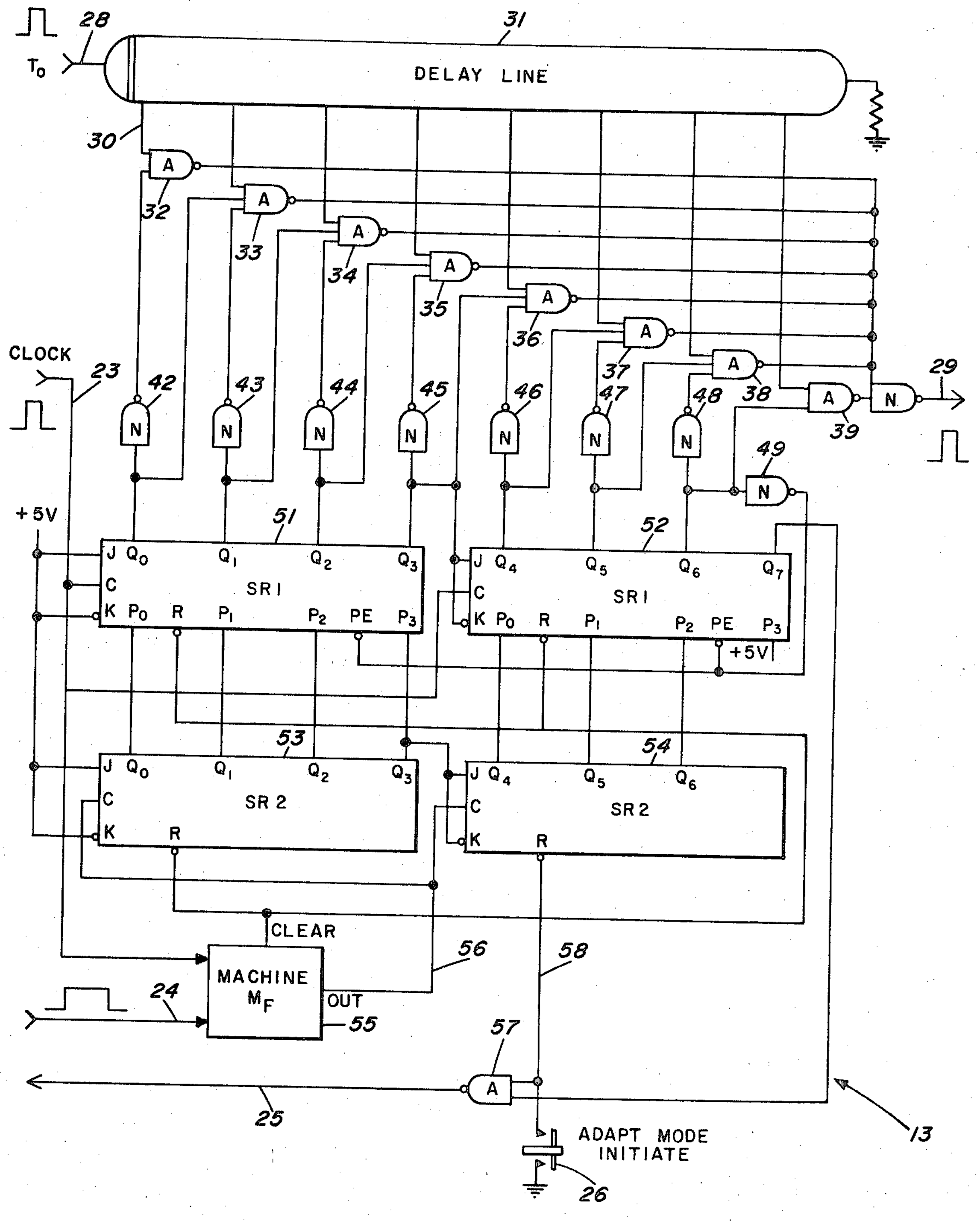
FIG. 2 is a schematic presentation of the strobe generator utilized in the invention.

Referring to FIG. 2, all shift registers illustrated are Fairchild 9,300 or an equivalent type and all other gates are TTL (transistor-transistor logic) or an equivalent type.

During nonadaptive mode operation when the strobe generator 13 is simply supplying a read strobe signal to the core memory, the strobe generator operates in the following manner: A pulse $T_O$, which is a reference pulse derived from core memory 11, is introduced to delay line 31 at input 28 and is allowed to propagate down delay line 31. AT the preselected tap, eight of which are shown, this pulse $T_O$ is removed from the delay line and returned to the core memory system at output 29. This delayed pulse is used to strobe data out of a sense amplifier of the memory and into the memory's data register.

When the system is put into the adaptive mode of operation by the initiation of data mode button 26, all registers of the strobe generator, registers 51–52 and 53–54 are cleared to zero. When register 51–52 is in this state, only tap 30 on delay line 31 is activated because a logic one is presented to the control input of AND-gate 32 and logic zeros are presented to the control inputs of AND-gates 33–39. The logic ones and zeros are presented to the above named AND gates by NOT-gates 42–48 which are responsive to serial register 51–52. With the AND gates set so that only gate 32 is activated, the exerciser performs its first test in its test sequence. When the first test in the sequence has been completed, a clock pulse along with a failure or no-failure pulse is transmitted to strobe generator 13 over lines 23 and 24 respectively. The clock pulse received by the strobe generator shifts a logic one into the first stage $Q_0$ of shift register 51–52. Because of this logic one in stage $Q_0$ of register 51–52, a logic zero is presented to the control input of AND-gate 32 and a logic one is presented to the control input of AND-gate 33. AND-gates 34–39 remain in the inactivated state. Reference pulse $T_0$, when introduced into delay line 31, now proceeds down delay line 31 to the tap controlled by gate 33 before it is removed from the delay line and sent back, at output 29, to the core memory to strobe data out of a memory sense amplifier and into the memory's data register.

This progressive shifting of logic ones into stages $Q_0$–$Q_6$ of shift register 51–52 is repeated until a number of trail strobe pulses, equal in number to the taps on delay line 31, are generated. This occurs when logic ones have been shifted into all the stages of serial register 51—52 except that the last stage, $Q_7$. When the output of stage $Q_6$ of serial register 51–52 is a logic one, preset enable stage PE of shift register 51–52 is at a logic zero because of NOT-gate 49. A logic one output at stage $Q_6$ also enables AND-gate 39 which controls the last tap on delay line 31. Pulse $T_0$ then traverses delay line 31 and exits at the eighth tap of delay line 31, leaving the strobe generator at output 29 to become the eighth strobe pulse. The clock pulse generated by the exerciser in response to its eighth test causes shift register 51–52 to be set according to the output logic, $Q_0$–$Q_6$, of shift register 53–54.

Shift register 53–54 contains the enabling arrangement of AND-gates 32–39 which would produce optimum strobe timing, as determined by machine 55. Machine 55 shifts logic ones into shift register 53–54 in response to failure and no-failure signals received from the exerciser over line 24.

Stages $Q_0$–$Q_6$ of shift register 53–54 are set by machine 55 to pick the tap on delay line 31 that represents optimum strobe timing for the memory. Consecutively with the completion of the eighth test of the exerciser causes data stored in register 53–54 to set stages $Q_0$–$Q_6$ of register 51–52. Immediately prior to the resetting of register 51–52, the clock pulse received by register 51–52 shifted a logic one into stage $Q_7$ of the register which presets this stage to enable the adapt mode upon subsequent actuation of adapt mode button 26. Upon the shifting of data from register 53–54 to register 51–52, the strobe generator and exerciser become inactive.

Figure 3:
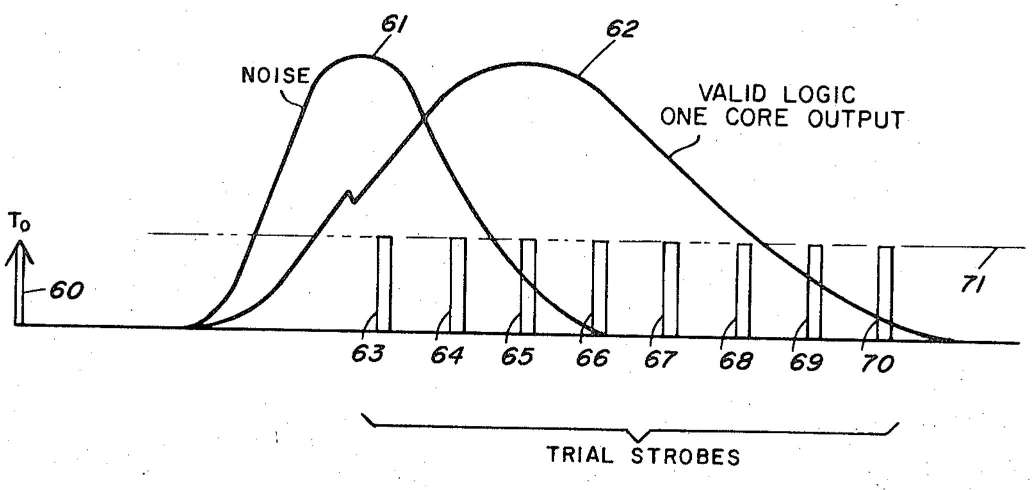
FIG. 3 is a wave form diagram showing the placement of the differently timed read pulses with respect to maximum core output and core noise.

To facilitate a better understanding of why timing of the read strobe pulse is essential reference should be made to FIG. 3. Pulse 60 represents the reference pulse $T_0$ derived from the core memory which is delayed a specific amount of time, according to the tap actuated at the time $T_0$ is propagated down the delay line. Eight strobe pulses 63–70, representing the output of the strobe generator for each of the eight tests are shown. Retrieving sample pulse 60 from delay line 31 at the first tap 30 results in strobe pulse 63. Actuation of the second tap results in strobe pulse 64, and so on. Curve 62 represents the current output of a memory core element. Curve 61 represents noise within the core in conjunction with the current output. As can be seen, if strobe pulse timing coincides with the timing represented by pulses 63 and 64, a logic one indication would be present because of noise in the core even though no logic one was stored within the core. If the timing was chosen to be that represented by pulses 69 and 70 a logic one would not be indicated even though a logic one was stored within the core because amplitude threshold 71 is not exceeded by the core output 62 at this point in time. The pulse timing that would result in a valid indication of the information stored within the memory would be the timing represented by pulses 65, 66, 67 or 68. Any one of these would produce an accurate memory retrieval. It is desirable, however, to utilize the timing corresponding to the center strobe of this group to obtain optimum operating time swing.

Machine 55 chooses the central strobe pulse of the acceptable group by shifting logic ones into shift register 53–54, in response to failure or no-failure signals received from the exerciser, at the same time that logic ones are being shifted into shift register 51–52. For each test in the series of tests performed by the exerciser in which failure occurs due to early strobe timing, for example, strobe 63 and 64, a logic one is shifted into serial register 53–54 coincidentally with a logic one being shifted into serial register 51–52. A logic one is shifted into serial register 53–54 for every other logic one that is shifted into serial register 51–52 for the group of trails in which no failure occurs, for example strobes 65–68. Finally, no logic ones are shifted into serial register 53–54 for the last group of tests such as 69 and 70 which represent failure due to late strobe timing.

Figure 4:
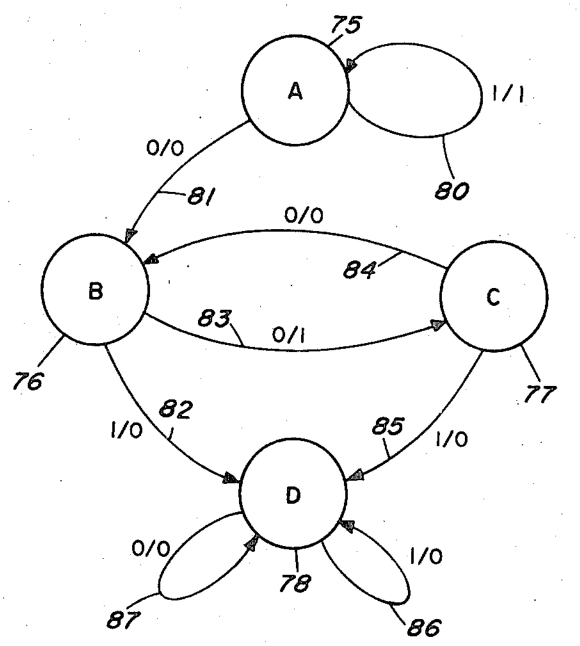
FIG. 4 is a transition graph illustrating the four states that the machine used in the strobe generator of FIG. 2 assumes during its function.

Operation of machine 55 can perhaps be better understood by referring to the transition graph of machine 55, illustrated in FIG. 4. The four states, A, B, C, D, of machine 55 are shown as circles 75–78. The initial state A is circle 75. The receipt of a failure signal by machine 55 on line 24 causes the machine to remain in the same state and shifts a logic one into serial register 53–54 every time a failure signal is This is illustrated by loop 80. The legend 1/1, as indicated on the drawing, represents input of the machine as compared to its output. A logic one represents failure and a logic zero represents a no-failure. When a no-failure signal is received on line 24, machine 55 is advanced by way of transition 81 to state B at the same time as a logic zero is shifted into shift register 53–54. If the signal succeeding the no-failure signal is also a no-failure signal, the machine will alternate between states B and C producing a logic one input to serial register 53–54 on transition 83 from state B to state C and a logic zero on transition 84 from state C to B. If at this point, a failure logic signal is received, the machine shifts from state B or C to state D by way of transition 82 or 85. A logic zero is shifted into serial register 53–54 when the machine is going through transition 82 or 85. State D is the terminal state of the machine. No further changes of state occur when the machine reaches state D. As can be seen from loops 86 and 87, when the machine is in this state, either a failure or no-failure signal causes a logic zero to be shifted into serial register 53–54.

Figure 5:
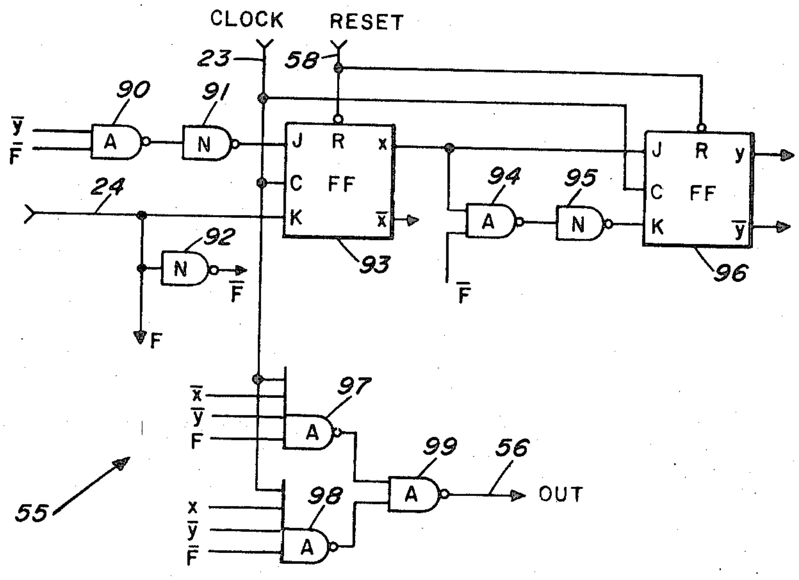
FIG. 5 is a hardware mechanization of the time transition graph of FIG. 4.

A mechanization of machine 55 is illustrated in FIG. 5. This is one embodiment of the many possible to accomplish the function illustrated in FIG. 4. All the gates and flip-flops 93 and 96 are TTL. Gates 91, 92, and 95 are NOT gates. Gates 90, 94, 97, 98 and 99 are AND gates. Failure and no-failure signals are received on line 24. Clock signals are received on line 23. The machine is reset to state A over line 58, at the time the adapt mode of the memory is actuated. Machine output is at line 56. In view of the straight forward operation of the structure of FIG. 5, further explanation is not seen as necessary.

The timing of delay line 31 and the spacing of the various taps on the delay line are not specified because such timing and spacing depends upon the particular memory system being used. The criteria, however, is that the first tap on the delay line must occur prior to the earliest strobe timing ever required by the memory system used; and the latest tap must occur after the latest strobe ever desired. The number of trails is arbitrary. But there should be a sufficient number so that there is enough resolution to obtain a strobe timing that is in the middle of the timing window defined by pulses 65–68 of our example.

In other words, a memory system which is built with loose timing tolerances will require strobes spread out over a wider range than a system built to tight timing tolerances. In addition, memory systems with faster cycle times will tend to have a narrower timing window. A two microsecond system, for example, would require from five to eight strobes spread over a 300 nanosecond interval.

Thus it can be seen that the adaptive memory system of the present invention provides for self adjustment of the memory read strobe pulse so as to eliminate the heretofore required manual adjustment of such read strobe pulses.

It should be understood, of course, that the foregoing disclosure relates to only a preferred embodiment of the invention and numerous modifications or alterations may be made therein without departing from the spirit and scope of the invention as set forth in the appended claims.

What is claimed is:

1. An adaptive memory system that provides self adjusting strobe pulse timing comprising:

a memory having data inputs and outputs, being adapted to accommodate externally generated strobe pulses;

interface gating connected to said memory by the data inputs and outputs of said memory and connected to data lines external to said memory system;

an exerciser connected to said interface gating and being capable, upon actuation, of causing said interface gating to switch the data inputs and outputs of said memory from connection to the data lines external to said memory system to connection to said exerciser and thereupon performing a series of failure tests on said memory;

a strobe generator connected to said memory and said exerciser for generating strobe pulses timed as required by said memory in response to said strobe generator's analysis of information received from said exerciser which is based on the failure tests said exerciser performed, and for actuating said exerciser, upon command, to initiate and perform the series of failure tests on said memory, said strobe generator comprising:

a failure analysis means for receiving failure test information from said exerciser and determining the optimum strobe pulse timing based on the received information;

a delay line having a plurality of taps along its length, each of the taps being connected through a switching means to a common point, the connection of each tap causing a different strobe pulse timing;

and logic circuit means responsive to the performance of each test in the series of failure tests performed by said exerciser for switching the connection to said common point from one tap to another tap along said delay line and responsive to the connection of the last tap of the plurality of taps to said common point for switching the connection to the tap causing the optimum strobe pulse timing as determined by said failure analysis means.

2. The adaptive memory system of claim 1 wherein said failure analysis means comprises:

a machine capable of assuming four different states, and producing logic zero and logic one outputs, the state assumed depending on the state said machine is in when an input signal, either a failure or no-failure signal, is received;

a serial register for receiving the outputs of said machine which outputs taken together determine the best estimate of strobe pulse timing.

3. The adaptive memory system of claim 2 wherein said logic memory circuit means comprises:

a plurality of AND gates, equal in number to the plurality of taps on said delay line, each tap on said delay line connected to a respective input of a different one of said plurality of AND gates;

a plurality of NOT gates, equal in number to said plurality of AND gates, the outputs of said plurality of NOT gates less one each being connected to a respective input of a different one of said plurality of AND gates, the remaining one of said plurality of NOT gates having all the outputs of said plurality of AND gates connected to its input;

a serial register having a plurality of outputs equal to said plurality of NOT gates less one, each output being connected to a respective input of said plurality of NOT gates.

4. The adaptive memory system of claim 1 wherein said logic circuit means comprises:

a plurality of AND gates, equal in number to the plurality of taps on said delay line, each tap on said delay line connected to a respective input of a different one of said plurality of AND gates;

a plurality of NOT gates, equal in number to said plurality of AND gates, the outputs of said plurality of NOT gates less one each being connected to a respective input of a different one of said plurality of AND gates, the remaining one of said plurality of NOT gates having all the outputs of said plurality of AND gates connected to its input;

a serial register having a plurality of outputs equal to said plurality of NOT gates less one, each output being connected to a respective input of said plurality of NOT gates.

* * * * *